United States Patent [19]

Elwood

[11] 3,988,734
[45] Oct. 26, 1976

[54] METHOD OF AND SYSTEM FOR LOCATING A POSITION

[76] Inventor: Albert A. Elwood, 4390 Westroads Drive, West Palm Beach, Fla. 33407

[22] Filed: Mar. 8, 1974

[21] Appl. No.: 449,453

Related U.S. Application Data

[63] Continuation-in-part of Ser. No. 186,206, Oct. 4, 1971, Pat. No. 3,797,015, Continuation-in-part of Ser. No. 186,136, Oct. 4, 1971, Pat. No. 3,839,719, Continuation-in-part of Ser. No. 186,112, Oct. 4, 1971, Pat. No. 3,816,832, Continuation-in-part of Ser. No. 833,638, June 16, 1969, Pat. No. 3,613,095.

[52] U.S. Cl. ...................... 343/112 R; 235/150.27; 343/112 D
[51] Int. Cl.² .......................................... G01S 5/14
[58] Field of Search .................... 343/112 D, 112 R; 325/103; 235/150.27

[56] References Cited
UNITED STATES PATENTS

| | | | |
|---|---|---|---|
| 2,036,165 | 3/1936 | Usselman | 325/103 |
| 3,797,015 | 3/1974 | Elwood | 343/112 D |

Primary Examiner—T.H. Tubbesing
Assistant Examiner—Richard E. Berger
Attorney, Agent, or Firm—Baldwin, Wight & Brown

[57] ABSTRACT

A method of and system for locating a position in which a plurality of frequency standard devices are synchronized or phase compared at the same initial location. Two of three frequency standard devices, in a two-dimensional embodiment, are placed at transmitting stations on a known baseline. The third device is at a (third) receiving station, which receives signals from the two transmitting stations. At each transmitting station, means are provided for producing and transmitting a different radio frequency carrier signal of fixed frequency and of fixed phase, phase modulated by a periodic modulating signal in the form of a time signal produced under the control of its frequency standard device. At the receiving station, means are provided for producing a reference signal corresponding to the periodic modulating signals and two radio frequency signals related in frequency, to the radio frequency carrier signals transmitted. The time reference signal is compared at the receiving station with the periodic modulating signals recovered from the radio frequency carriers to determine respective time differences representing coarse position data. The phase relationships between each of the received radio frequency carrier signals or of signals derived therefrom by mixer means and respective ones of the two radio frequency signals produced at the receiving station are determined, representing fine position data. Methods and systems for locating a position in three dimensions are also described. The fine ranges, distances within given lanes, are respectively added by a computer or an internal computing circuit to respective coarse ranges, each of which represents the total number of lanes to the full lane closest to respective ones of the transmitting stations, the totals being the distances between the receiving station and each of the transmitting stations.

43 Claims, 8 Drawing Figures

METHOD OF AND SYSTEM FOR LOCATING A POSITION

This application is a continuation-in-part of each of my co-pending applications Ser. No. 186,206, now U.S. Pat. No. 3,797,015, filed Oct. 4, 1971, for "Method of and System for Locating a Position," Ser. No. 186,136, now U.S. Pat. No. 3,839,719, filed Oct. 4, 1971, for "Radio Transmitting Station," and Ser. No. 186,112, now U.S. Pat. No. 3,816,832, filed Oct. 4, 1971, for "Radio Receiving Station". Each of said prior applications filed Oct. 4, 1971 is a continuation-in-part of my application Ser. No. 833,638 filed June 16, 1969, for "Method of and Apparatus for Locating a Position," now U.S. Pat. No. 3,613,095 issued Oct. 12, 1971.

BACKGROUND OF THE INVENTION

1. Field of the Invention

This invention relates in general to position locating and in more particularity to a method and system for accurately locating a specific position.

Although both the method and the system are of general utility they are especially useful in offshore oil surveys where it is important that a specific location be accurately and precisely identified. In an operation such as an offshore oil survey two transmitting stations would be land-based whereas a receiving station would be located on an offshore vessel which can be moved to an exact location which is being sought.

2. Description of the Prior Art

Many phase or time comparison systems have been developed for locating a position and are in use today. There are those based on the radar principle in which an echo or return of signal technique is used; there are those based on the use of transponders where receipt and retransmission of a signal are utilized; and there are those based on the Loran principle where time difference in the receipt of two transmitted pulses define a hyperbolic line of position.

SUMMARY OF THE INVENTION

Due to the high stability of atomic clocks, which are accurate on the order of one part in $10^{12}$ or $10^{13}$, no continuous synchronization between stations is required once the initial synchronization among three atomic clocks is performed or the initial phase/time relationships among the three atomic clocks are established.

The frequency of an atomic clock is determined by atomic particle or molecular vibrations and thereby remains constant. Its accuracy is about one hundred to one thousand times as great as that of the quartz clock in which the vibration frequency changes in the course of time. Due to the constancy of the frequency of an atomic clock a new and novel system of position locating has been discovered.

Coarse range is defined as the total number of phase rotations at the carrier frequency (wavelengths) over the distance between each transmitting station and the receiving station, measured to the nearest full phase rotation in a direction along the transmitting station radials toward each transmitting station. Full phase rotations (wavelengths) or even fractions thereof may be further defined as lanes.

Fine range is defined as the position of the receiving station within a given phase rotation, or lane, measured in a direction along the transmitting station radials toward each transmitting station.

Coarse and fine range are combined in a computer to determine the distance in lanes and fractions of a lane to each transmitting station from the receiving station. Because of this, the system may be defined as a range-range system. The computer may be an appropriately programmed, sophisticated computer used to convert the ranges into position with respect to any grid or geographic reference that may be desired.

It is the principal object of the invention to provide a method of and a system for locating a position in which frequency standard devices are used to provide coarse and fine position data which represent respectively coarse and fine ranges.

It is an additional object of the invention to provide a method of and a system for locating a position in which frequency standard devices at transmitter locations are used to produce radio frequency carrier waves which are phase compared with signals produced at a receiving station, under the control of a frequency standard device, to provide fine position data, and periodic time signals under the control of the frequency standard devices at the transmitter locations, are phase modulated on the radio frequency carriers, recovered at the receiving station and compared with corresponding time reference signals produced at the receiving station, under the control of the frequency standard device at the receiving station, to provide coarse position data.

A further object of the invention is to provide a method of and a system for position locating in which atomic clocks or the like are utilized to provide periodically phase modulated constant frequency signals having constant known absolute phase relationships with one another; the received signals are then converted into distance data by determining the phase differences of the constant frequency signals and differential positions of recovered periodic modulation signals, which are time signals, using a plurality of time reference signals produced at a receiving station under the control of an atomic clock.

Another object of the invention is to provide a position locating system in which no continuous synchronization between stations is required once initial synchronization is performed or phase relationships among atomic clocks established.

A still further object of the invention is to provide a position locating method and system in which the signal transmissions are single path and do not require an echo and/or retransmission.

Yet another object of the invention is to provide a position locating system in which atomic clocks or the like are utilized to provide a plurality of signals having known phase relationships with one another and a plurality of time and reference signals having known time relationships with one another to develop respectively fine and coarse position information, the time signals being periodic phase modulating signals.

A still further object of the invention is to provide a method of and a system for locating a position in three dimensions using three transmitting stations, controlled by frequency standard devices, and a receiving station which also uses a frequency standard device to provide signals for comparison with signals received from the transmitting stations.

Still another object of the invention is to provide a method of and a system for locating a position in three dimensions using three transmitting stations, controlled by frequency standard devices, and a receiving station which also uses a frequency standard device to provide signals for comparison with signals received from the transmitting stations, at least one of the transmitting stations being carried by a satellite.

It is yet another object of the invention to provide a receiving station, particularly useful in the system and method, which includes phase demodulators for recovering time signals from received radio signals and provides fine and coarse distance data.

It is yet a further object of the invention to provide a transmitting station having periodic phase modulating means controlled from a frequency standard which also controls the production of its carrier.

Further features, objects, and advantages will either be specifically pointed out or become apparent when, for a better understanding of the invention, reference is made to the following written description taken in conjunction with the accompanying drawings.

BRIEF DESCRIPTION OF THE DRAWINGS

FIG. 1C is a diagrammatic pictorial view illustrating the use of a method and system, in a three-dimensional arrangement, according to the present invention in which two transmitting stations are used in conjunction with an altimeter which can be carried on an aircraft or the like;

FIG. 1D is a diagrammatic pictorial view illustrating the use of a method and system, in a three-dimensional arrangement according to the present invention in which three transmitting stations are used, one of them being carried by a satellite;

DESCRIPTION OF PREFERRED EMBODIMENTS

Figure 1A:
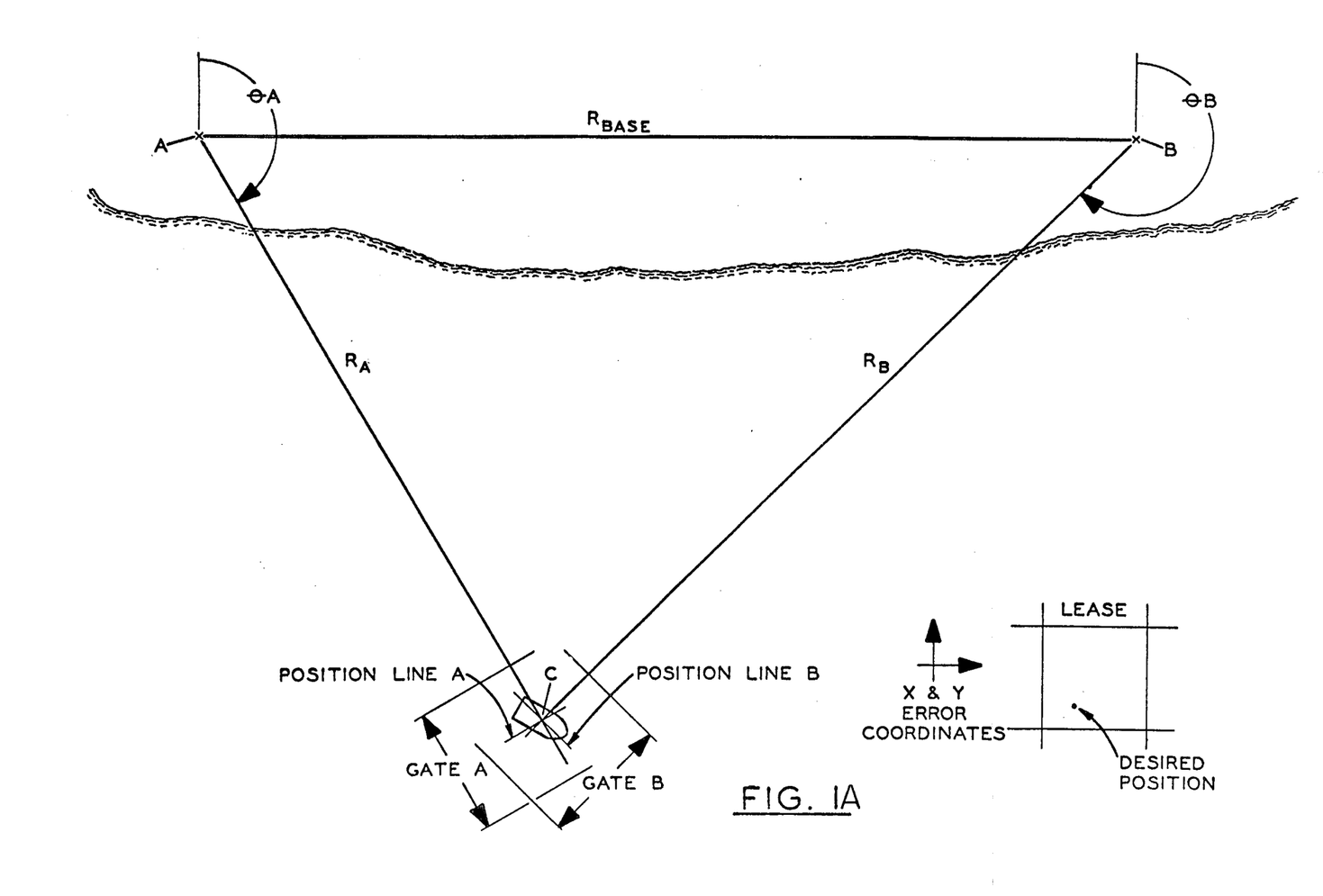
FIG. 1A is a diagrammatic view illustrating the use of a method and system, in a two-dimensional arrangement, according to the invention.

Referring now to FIG. 1A of the drawings, a system according to the invention will include a transmitting station A which is placed at a known position, a transmitting station B which is placed at a known position, with A and B placed on a known baseline $R_{base}$, and a receiving station C which is at an unknown position and becomes the measured or located position.

Figure 1B:
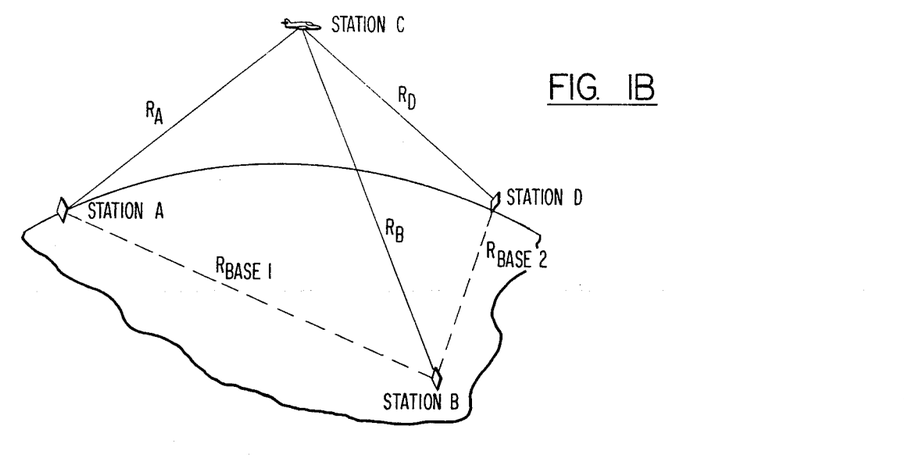
FIG. 1B is a diagrammatic pictorial view illustrating the use of a method and system, in a three-dimensional arrangement, according to the invention in which three transmitting stations are used.

As illustrated in FIG. 1B, a three-dimensional system according to the invention may include a transmitting station A, a transmitting station B and a transmitting station D each placed at a respective location, spaced from one another. Stations A and B are placed on a known baseline $R_{base\ 1}$ and stations B and D are placed on a known baseline $R_{base\ 2}$. A receiving station C, illustrated as being carried by a moving aircraft, is at an unknown position and becomes the measured or located position.

Figures 1C, 1D:
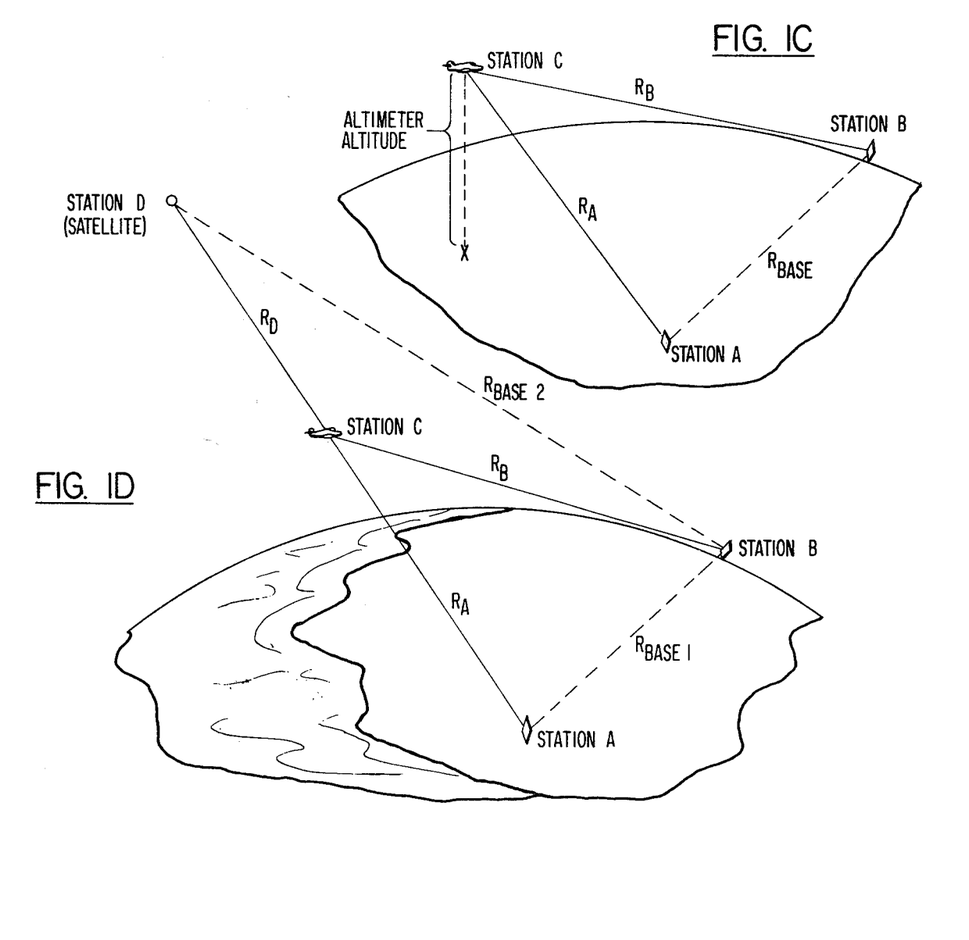

As shown in FIG. 1C, a three-dimensional system according to the invention may comprise a transmitting station A which is placed at a known position, a transmitting station B which is placed at a known position, stations A and B being positioned on a known baseline $R_{base}$, and a receiving station C shown as being carried by a moving aircraft which is at an unknown position. The aircraft carries as part of its equipment an altimeter.

As illustrated in FIG. 1D, a further three-dimensional system according to the invention may include a transmitting station A, a transmitting station B and a transmitting station D each positioned at respective locations, spaced apart from one another. Stations A and B are placed on a known based baseline $R_{base\ 1}$ and stations B and D are placed on a known baseline $R_{base\ 2}$. As illustrated, station D is carried by a satellite which may be either a synchronized satellite or an unsynchronized satellite having a predictable orbit and known position at a given time. A receiving station C, illustrated as being carried by a moving aircraft, is at an unknown position and becomes the measured or located position.

Figure 2:
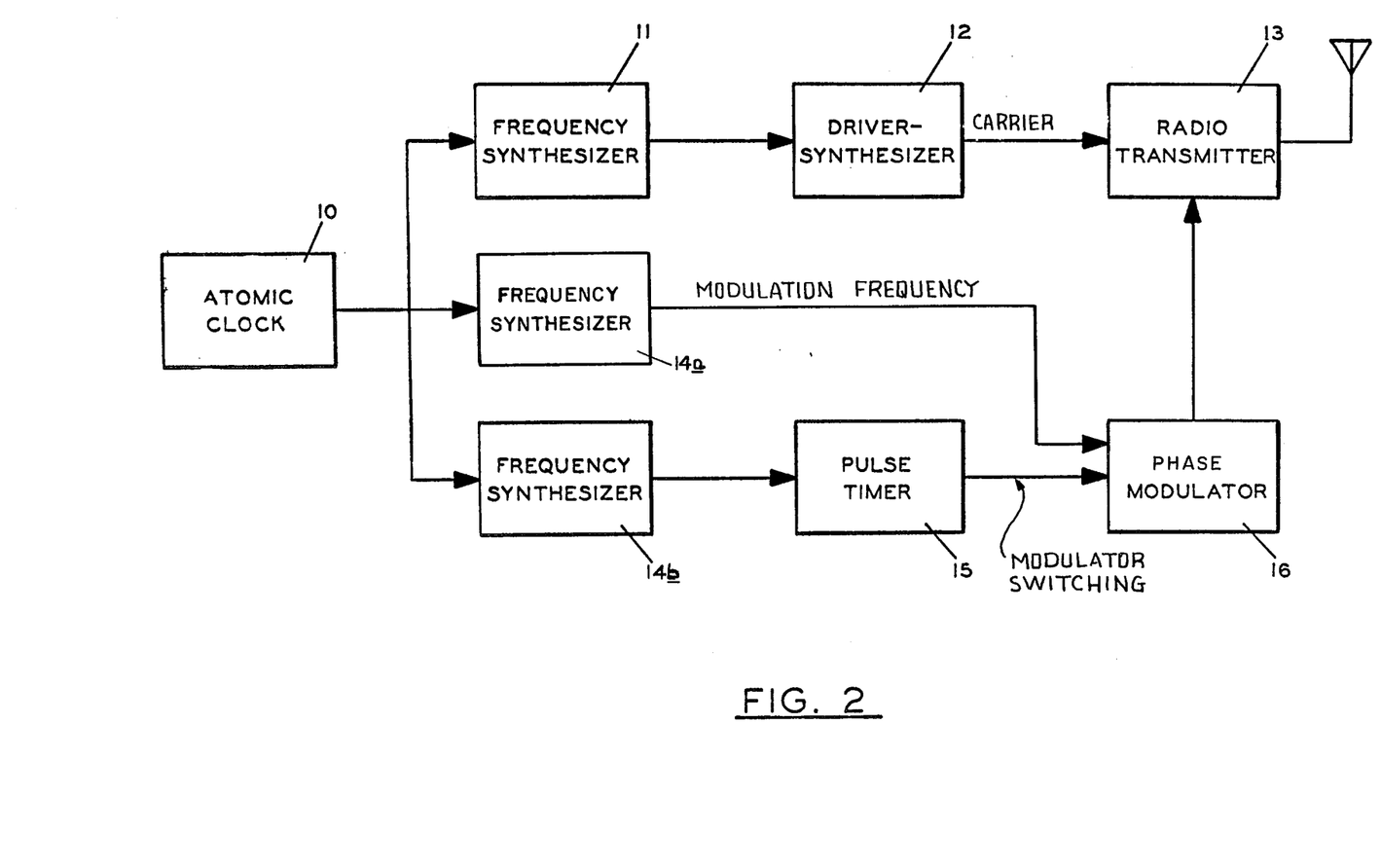
FIG. 2 is a block diagram of an illustrative embodiment of one of the transmitting stations of the system.

The two transmitting stations illustrated here as shore-based stations A and B (FIGS. 1A and 1C) and transmitting stations A, B and D (FIGS. 1B and 1D) are illustrated in greater detail in FIG. 2. The station shown is duplicated at A and B or A, B and D with the only essential difference being that different RF frequencies are transmitted from respective stations.

As illustrated in FIG. 2, a transmitting station includes an atomic clock 10 which provides a high frequency signal, for example 9 $GH_z$, which is utilized in two ways. The high frequency signal is fed to a frequency synthesizer 11 where it is reduced in frequency to a selected frequency in a range suitable for transmission over distances of up to about 100 miles, in an exemplary system, and for accuracy of phase determination. The range may be, for example, from about 1.0 to about 5.0 $MH_z$. The frequency synthesizer 11 converts the high frequency signal, from the clock 10 to one in the lower range (1.0 – 5.0 $MH_z$) while maintaining the stability of the primary standard from the clock 10. The output of the frequency synthesizer 11 which is extremely accurate in its phase and frequency characteristics is fed to a driver synthesizer 12 wherein it is amplified to a level sufficient to drive a highly stable radio transmitter 13. The radio transmitter 13 is provided with an antenna from which a radio frequency signal of given frequency within the selected range and of precise phase and frequency is transmitted. Thus, the stability and accuracy of the clock 10 is preserved and reflected in the radiated signal.

The high frequency signal from the clock 10 is also fed to a frequency synthesizer 14b wherein it is converted to a given signal in a suitable lower range to supply an input to a pulse timer 15 having a pulse output of, for example, one pulse of 3 seconds duration every 12 seconds. The high frequency signal from the clock 10 is also fed to a frequency synthesizer 14a where it is converted to a tone in the range of from about 500 $H_z$ to about 1000 $H_z$. The synthesizers 14a and 14b, like the synthesizer 11, preserve the accuracy and stability of the clock 10 and reflect the accuracy thereof in their own respective outputs. The output from the synthesizer 14b is coupled, as a synchronizing signal, to the time signal format generator or pulse timer 15. The pulse timer 15 produces a train of pulses which are very accurately positioned with respect to one another. The pulses, time signals, may be positioned, for example, at 12 second intervals, as indicated above.

The pulses from the pulse timer 15 are fed to a phase modulator 16 which, in turn, is arranged to modulate periodically the transmitter 13, the phase modulator 16 receiving its modulation signal from the frequency synthesizer 14a.

The periodic modulation signals appearing on the carrier signals from the transmitting stations A, B and D (FIGS. 1B and 1D) or A and B (FIGS. 1A and 1C) are utilized at a moving receiving station C (FIGS 1A–1D) to produce coarse position information data, and the phase relationships of the radio frequency carrier signals from the transmitting stations, or I.F. signals derived from these signals, are utilized to produce fine position information data.

Figure 3:
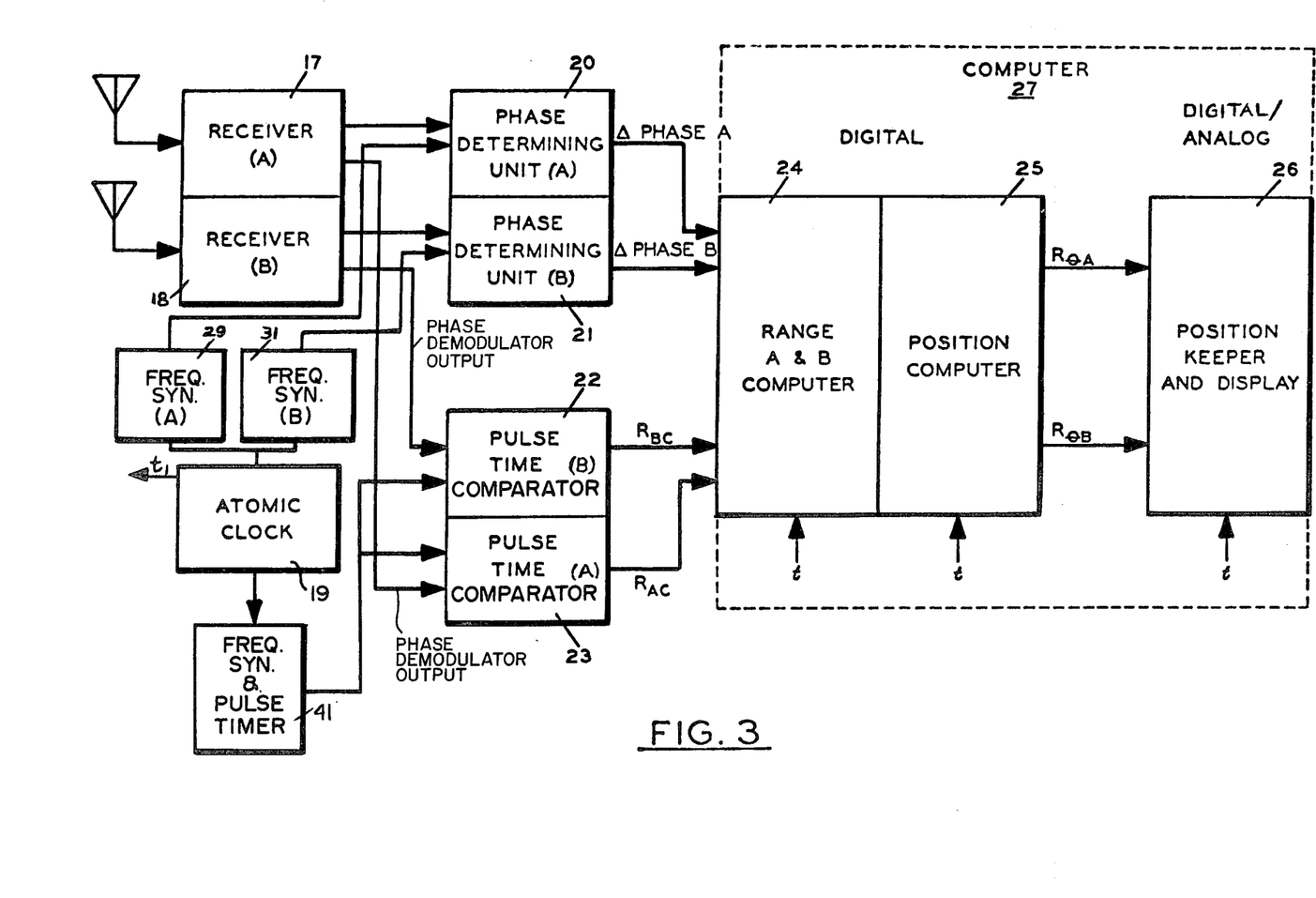
FIG. 3 is a block diagram of an illustrative embodiment of one of the receiving stations of the system.

The signal from the radio transmitter 13 at the station A (FIG. 1A) is received by the receiver 17 (FIG. 3) while the signal from the radio transmitter 13 at the station B (FIG. 1A) is received by the receiver 18 (FIG. 3). Radio frequency output signals from the receivers 17 and 18 are fed to phase determining units 20 and 21, respectively, each of which compares, as shown, the phase of respective radio frequency signals with the phase of the radio frequency signals from frequency synthesizers 29 and 31 which have their respective inputs coupled to an atomic clock 19. The phase differences translated into digital signals, $\Delta$ phase A and $\Delta$ phase B, representative of phase difference are fed into a range computer 24 of a computer 27 of the system and converted into two range signals indicating fine position information within a particular lane which may be, for example, 720 feet wide. Each degree of relative phase rotation in the example represents two feet. Of course, the outputs of the phase determining units 20 and 21 do not provide lane identification.

Each of the receivers 17 and 18 is provided with phase demodulators, not shown, which recover the time signals from the received radio signals. These recovered time signals are in the form of pulse signals which are fed to pulse time comparators 23 and 22, respectively. Each of the pulse timers 22 and 23 compares the time of occurrence of each of the pulse signals recovered by the phase demodulators with the time of occurrence of pulses in a train of pulses, which are time reference signals, fed to each of the pulse time comparators 22 and 23 from a frequency synthesizer and pulse timer 41 which has its input coupled to the atomic clock 19. The pulse time comparators 22 and 23 provide output coarse range digital signals $R_{BC}$ and $R_{AC}$ which are also fed into the range computer 24, the output of which is coupled to a position computer 25 which provides output signals $R_{\theta A}$ and $R_{\theta B}$ representing the accurate distance the station C is from each of the stations A and B, as illustrated in FIG. 1A.

In order to assure that the phase modulation carried by the radio signals received does not adversely affect the $\Delta$ phase A and $\Delta$ phase B outputs from the phase determining units 20 and 21, it is desirable that appropriate digital filters be provided in the output circuits of these units, which filters would act, in analog terms, as low pass filters while rejecting those relatively higher frequency signal components associated with the periodic phase modulation.

The position computer 25 operates a position keeper and display 26 which converts the two ranges from the shore stations A and B into precision position in any selected coordinate system. Signals $R_{\theta A}$ and $R_{\theta B}$ may be either digital or analog signals and the position keeper and display 26 may be either digital or analog or both. The atomic clock 19 is provided with a timing output signal $t_1$ which is used to synchronize the computer 27 as illustrated generally by timing inputs $t$ which are provided by count-down circuits, not shown, which are driven by the timing signal $t_1$. Alternatively, the timing signal $t_1$ could be directly fed into the computer 27 provided that the computer 27 contains suitable count-down circuits.

Figure 4:
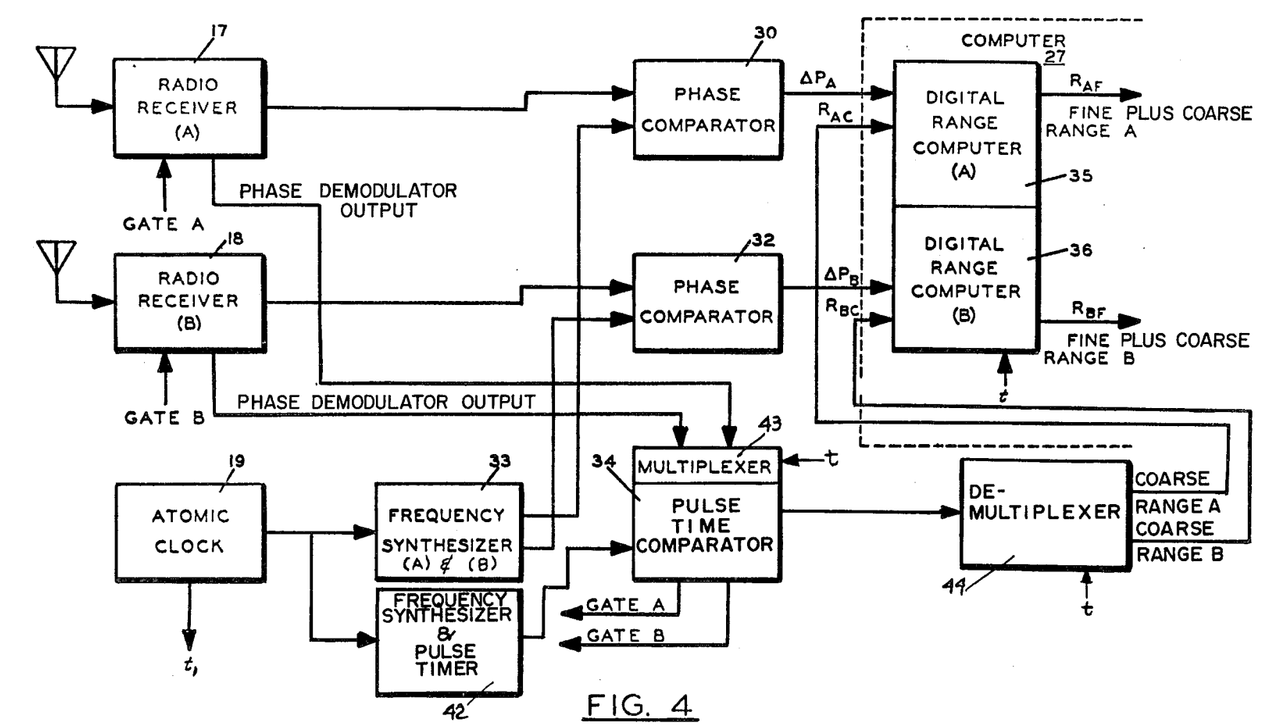
FIG. 4 is a block diagram in greater detail of part of a typical receiving station; the two sheets of the drawing containing FIG. 4 are to be placed end-to-end to illustrate a complete station including a computer.

FIG. 4 illustrates in greater detail the instrumentation used in the offshore station when the system is being used to locate an offshore position.

The phase determining unit 20 of FIG. 3 is shown, in FIG. 4, as a phase comparator 30. The phase determining unit 21 of FIG. 3 is shown in FIG. 4 as a phase comparator 32.

Frequency synthesizers 33, shown in FIG. 4, correspond to the frequency synthesizers 29 and 31 shown in FIG. 3 and a frequency synthesizer and pulse timer 42 correspond to the frequency synthesizer and pulse timer 41 shown in FIG. 3.

In the embodiment illustrated in FIG. 4, the function of the two pulse time comparators 22 and 23 illustrated in FIG. 3 is performed by a single pulse time comparator 34 which has its pulse inputs from the receivers 17 and 18 and provide via a multiplexer 43, and its outputs representative of coarse ranges A and B data fed to the computer 27 via a de-multiplexer 44.

Digital outputs from the phase comparators 30 and 32 are fed respectively to digital range computers 35 and 36 as fine position data, while outputs from the pulse time comparator 34 are fed respectively to the digital range computers 35 and 36 as coarse position data.

The phase comparators 30 and 32 preferably are, as the phase determining units 20 and 21 of FIG. 3, provided with appropriate filters which pass low to zero frequency representing signals while rejecting higher frequency representing signals.

The two digital range computers 35 and 36 process their respective data inputs to provide output signals representing the coarse plus fine range of station C from the stations A and B respectively. The combined representation is extremely accurate.

The outputs from the digital range computers 35 and 36 are fed to a digital position computer 37 associated with a data storage apparatus 39 which provides baseline and shore base station information. Using stored information from the storage apparatus 39, the digital position computer 37 translates the added coarse and fine position data supplied from the range computers 35 and 36 into position signals $R_{\theta A}$ and $R_{\theta B}$ which are fed to a digital/analog storage generation and display device 31, the output of which is fed to a position display 40.

The device 31 is provided with a storage means which contains phase correction data reflecting the initial absolute phase differences between three atomic clocks. Additional stored information, as desired, may be provided or developed within the device 31 such as bearing, range, course, and known distance to the desired position within an offshore lease, for example, as shown in FIG. 1A. In some applications, such as a fast moving station C, Doppler correction data could be developed or stored within the device 31. In the embodiment illustrated in FIG. 4, the atomic clock 19 provides a timing output signal $t_1$ which is used to develop, in circuitry not illustrated, timing signals generally designated $t$ which synchronize the computer 27, the position keeper 28, the multiplexer 43 and the de-multiplexer 44. The pulse time comparator 34 is provided with two gating outputs A and B which are used to gate the radio receivers 17 and 18, thus providing for receipt by the multiplexer 43 of phase demodulator outputs from the receivers 17 and 18 on an alternating basis.

While the foregoing discussion is concerned principally with description of the method and system of the invention and its operation in a two-dimensional arrangement, it will be clear that the invention may be applied equally well in three-dimensional arrangements. It is suitable, for example, for locating the position of an aircraft or other object which moves in three dimensions. FIGS. 1B, 1C and 1D show three exemplary three-dimensional arrangements.

Referring to FIG. 1B, a three-dimensional system according to the method and system may include a transmitting station A, a transmitting station B and a transmitting station D each placed at a known position and spaced from one another. A receiving station C, carried by an aircraft, is at an unknown position and becomes the measured or located position in three dimensions. The three transmitting stations A, B and D (FIG. 1B) may be constructed as the transmitting station illustrated in FIG. 2, the only essential difference among the transmitting stations A, B and D being that different RF frequencies are transmitted from respective transmitting stations. In the case of a rapidly moving aircraft (FIG. 1B), each of the transmitting stations A, B and D is desirably provided with a pulse timer 15 (FIG. 2) which produces pulses having a pulse repetition rate of 10-pulses-per-second, a higher rate than the one-pulse-every-10-seconds rate used for locating a slow moving survey ship (FIG. 1A) or a one-pulse-per-second rate suitable for locating fast moving ships. As illustrated in FIG. 1B, the receiving station C (FIG. 1B) may be constructed similarly, for example, to either the receiving station shown in FIG. 3 or the receiving station shown in FIG. 4, it being understood, in either case, that an additional radio receiver suitable for receiving signals from the transmitting station D would be provided at receiving station C as well as instrumentalities for developing $\Delta$ phase D and $R_{DC}$ signals which would be fed to the computer 27 in addition to the $\Delta$ phase A, $\Delta$ phase B, $R_{AC}$ and $R_{BC}$ signals. The frequency synthesizer and pulse timer 41 (FIG. 3) or 42 (FIG. 4) would, of course, produce pulses having the same repetition rate as the pulses produced by the pulse timer 15.

In FIG. 1C, a three-dimensional system for locating the position according to the invention may include a transmitting station A, which is placed at a known position, a transmitting station B, which is placed at a known position, with stations A and B being on a known baseline $R_{base}$, and a receiving station C, illustrated as being carried by an aircraft which is at an unknown position and becomes the located or measured position. In the arrangement shown in FIG. 1C, the two transmitting stations A and B may be constructed as the transmitting station illustrated in FIG. 2 and the receiving station C may be constructed, for example, similarly to either the receiving station shown in FIG. 3 or the receiving station shown in FIG. 4. In the system illustrated in FIG. 1C, however, the receiving station C, which is carried by the aircraft, includes an altimeter (not shown) of known construction which develops height data which is fed to the computer 27 (FIGS. 3 and 4) thereby enabling the computer 27 to determine the position of station C in three dimensions, the computer 27 being capable of determining distances $R_A$ and $R_B$ in accordance with the system as shown in FIG. 1A.

Turning now to FIG. 1D, a three-dimensional system similar to that shown in FIG. 1B is shown, the only essential difference being that transmitting station D is carried by a satellite. The satellite may be either a synchronous satellite or a non-synchronous satellite. If the satellite is synchronous, its position is fixed relative to transmitting stations A and B (FIG. 1D) and the system operates identically to the system shown in FIG. 1B. If the satellite is non-synchronous, its position is constantly changing relative to the positions of transmitting stations A and B (FIG. 1D) in a predetermined pattern. In the latter case, the computer 27 (FIGS. 3 and 4) is provided with a data store which supplies a signal indicative of the instantaneous position of the non-synchronous satellite at any given time. Thus, the computer 27 (FIGS. 3 and 4) may determine from signals representative of $\Delta$ phase A, $\Delta$ phase B, $\Delta$ phase D, $R_{AC}$, $R_{BC}$, $R_{DC}$, as in FIG. 1B, and the signal representing the instantaneous position of the non-synchronous satellite, the position of receiving station C. In case the satellite is non-synchronous, it is desirable to provide that the transmitting stations A, B and D be provided with the transmitter shown in FIG. 2 with its pulse timer 15 arranged to produce pulses at a repetition rate of about 100-pulses-per-second, a somewhat lower rate of about 10-pulses, per-second being appropriate when the satellite is of the synchronous type. Of course, the receiving station C carried by an aircraft (FIG. 1D) would be provided with a frequency synthesizer and pulse timer 41 (FIG. 3) or 42 (FIG. 4) which produces pulses having the same repetition rate as the repetition rate of the pulses produced by the pulse timer 15 (FIG. 2).

The foregoing description, particularly as it relates to the receiving stations illustrated in FIGS. 3 and 4 involves the use of tuned radio frequency signal receivers. The noise rejection characteristics of the receiving stations can be considerably improved by using superheterodyne receivers, particularly superheterodyne receivers which involve double conversion. Since the receivers desirably should have low gain and broad bandwidths i.e., 2–3 KHz, in order to avoid injecting any unwanted phase shifts, it is desirable to use superheterodyne receivers which tend to reject noise signals while maintaining the phase relationships of the signals sought to be amplified. Such a superheterodyne receiver, which may be used as the receiver 17 (FIG. 3), for example, and similarly for the other receivers to be used at a receiving station location, is illustrated in FIG. 5.

Figure 5:
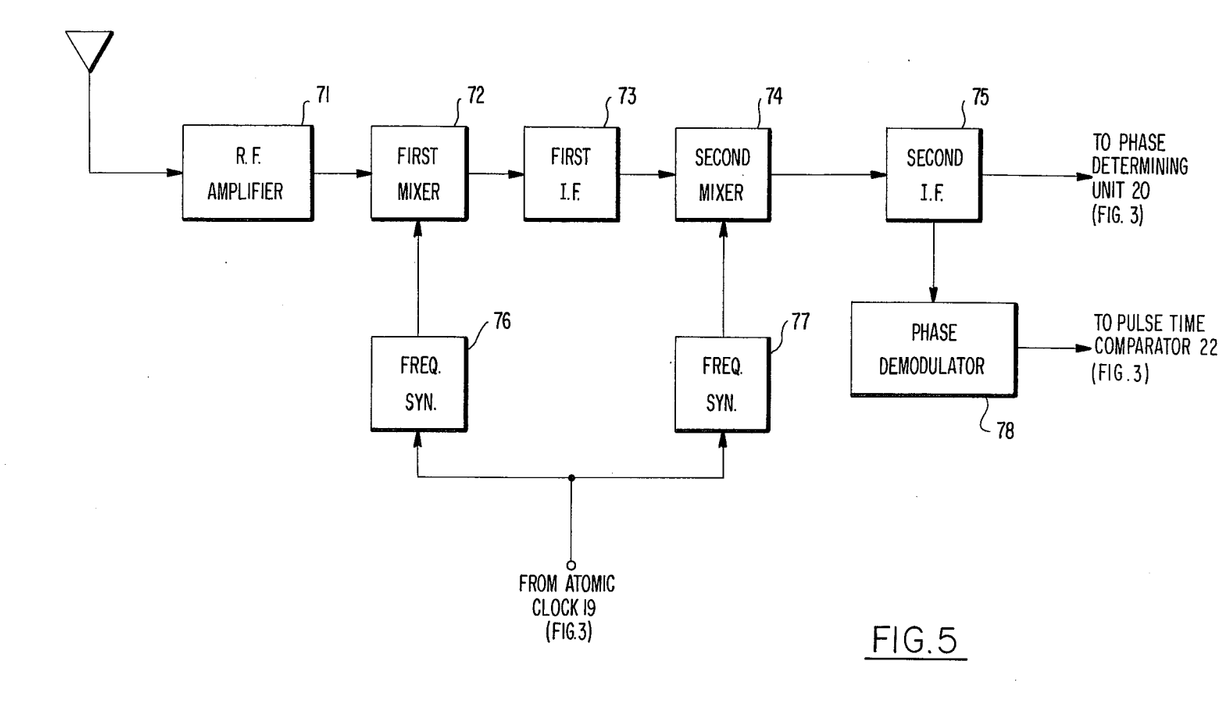
FIG. 5 is a block diagram of part of a receiver which may be used in a receiving station according to the invention, the receiver being a superheterodyne receiver.

As illustrated in FIG. 5, the receiver 17 (FIG. 3) at a receiving station includes, in cascade, an R.F. amplifier 71, a first mixer 72, a first I.F. amplifier 73, a second mixer 74 and a second I.F. amplifier 75. The receiver includes a frequency synthesizer 76 and a frequency synthesizer 77 which are provided with respective outputs from the atomic clock 19 (FIG. 3), the frequency synthesizers 76, 77 producing signals of appropriate respective frequencies for local oscillators suitable for supplying locally generated signals to the mixers 72, 74.

The I.F. amplifiers 73 and 75 are carefully designed not to distort the signals which are amplified therein, so far as the phase information present on the I.F. signals is concerned; the I.F. amplifiers 73 and 75 operate as phase locked amplifiers by virtue of their associated local oscillators, which are fed from synthesizers connected to the atomic clock. Since the mixers 72 and 74 are provided with inputs controlled by the atomic clock 19 (FIG. 3), the phase information in the signals processed in the receiver and the modulation information is not distorted, shifted, or destroyed.

The I.F. output signal from the second I.F. amplifier 75 is fed to a phase demodulator 78 which, in turn, feeds its output signal to one input of the pulse time comparator 23 (FIG. 3) which receives a corresponding time reference signal from the frequency synthesizer and pulse timer 41 (FIG. 3).

The I.F. output signal from the second I.F. amplifier 75 is also fed to one input of the phase determining unit 20 (FIG. 3), its other input being supplied with a signal having the same frequency as that of the I.F. output signal from the amplifier 75. The second signal supplied to the phase determining unit 20 (FIG. 3) is supplied from the frequency synthesizer 29 (FIG. 3).

It is to be appreciated that the receiver 18 (FIG. 3) and the receivers 17, 18 (FIG. 4) may, and desirably are, constructed as double superheterodyne receivers similar to the receiver illustrated in FIG. 5.

Although the present invention has been illustrated as involving a moving receiving station and two or three transmitting stations, it is to be appreciated that the receiving station could be fixed and one of the transmitting stations moving. In some special applications all of the stations could be moving.

While the present invention has been illustrated, in general, as one in which the signal outputs from phase comparators and pulse time comparators are digital, the outputs from these units could, if desired, be made analog in which case the analog outputs could be combined in a network, servo system, or the like. For the sake of accuracy, however, the outputs from the phase comparators are desirably digital.

The present invention is highly accurate and serves to eliminate lane ambiguity without the need to be operating at all times or accumulating lanes, as for example when a vessel carrying the receiving station leaves shore and proceeds to sea.

The atomic clocks used in the present invention may be provided by cesium beam tubes such as the tube forming part of a Hewlett-Packard cesium beam frequency standard sold under model number 5061A. The transmitters and receivers may be of various constructions, and should be extremely stable. The computer used may be, for example, a Control Data Corporation 5103A system or a Control Data Corporation 469 system, the latter being particularly suitable for use in aircraft.

It will be appreciated that many variations of the present invention are possible, and the foregoing detailed description relates only to illustrative embodiments. It is to be understood that various changes may be made by those skilled in the art within the principle and scope of the invention as expressed in the appended claims.

I claim:
1. A position locating system using phase of carrier signals and phase modulation signals thereon to develop respectively fine and coarse position location data, the system comprising a first source of a signal of given frequency and given phase, a second source of a signal of said given frequency and a predetermined phase relationship with said given phase, a third source of a signal of said given frequency and a predetermined phase relationship with said given phase, means controlled by said first source for transmitting a first radio signal from a first point including first phase modulating means controlled by said first source for periodically phase modulating said first radio signal with a first time signal, means controlled by said second source for transmitting a second radio signal from a second point including second modulating means controlled by said second source for periodically phase modulating said second radio signal with a second time signal, means controlled by said third source for generating a first local signal having a frequency related to that of said first radio signal and a second local signal having a frequency related to that of said second radio signal at a third point, means controlled by said third source for periodically producing time reference signals, means receiving said first radio signal and said second radio signal at said third point for developing respective signals therefrom having respective frequencies identical to the frequencies of said first local signal and of said second local signal, first phase comparing means at said third point for comparing the phase of said first local signal with that of the corresponding signal developed from said first radio signal, second phase comparing means at said third point for comparing the phase of said second local signal with that of the corresponding signal developed from said second radio signal, phase demodulator means at said third point for recovering said first time signal and said second time signal, and means for comparing respectively said first time signal and said second time signal with said time reference signals.

2. A position locating system according to claim 1 wherein said first source, said second source and said third source are respectively first, second and third atomic clocks.

3. A position locating system as claimed in claim 1 including computer means for receiving output signals from said first phase comparing means, said second phase comparing means and said means for comparing respectively said first time signal and said second time signal with said time reference signals for providing output signal data representative of the distance the third point is from the first and second points.

4. A position locating system as claimed in claim 3 including means controlled by said computer means for storing and displaying said output signal data.

5. A position locating system according to claim 1 wherein said means controlled by said third source for generating a first local signal and a second local signal comprise means for generating a first local signal having a frequency identical to that of said first radio signal and a second local signal identical to that of said second radio signal.

6. A position locating system according to claim 1 wherein said means for developing respective signals having respective frequencies identical to the frequencies of said first local signal and of said second local signal comprise mixer means responsive to said first radio signal and to said second radio signal as received at said third point.

7. A position locating system according to claim 6 wherein said mixer means are provided with locally generated signals produced under control of said third source of a signal.

8. A position locating system according to claim 1 comprising a fourth source of signal of said given frequency and a predetermined phase relationship with said given phase, means controlled by said fourth source for transmitting a third radio signal from a fourth point including third phase modulating means controlled by said fourth source for periodically phase modulating said third radio signal with a third time signal, means controlled by said third source for generating a third local signal having a frequency related to that of said third radio signal at said third point, means receiving said third radio signal at said third point for developing a signal therefrom having a frequency identical to that of said third local signal, third phase comparing means at said third point for comparing the phase of said third local signal with that of the corresponding signal developed from said third radio signal, additional phase demodulator means at said third point for recovering said third time signal, and means for comparing said third time signal with said time reference signals.

9. A position locating system according to claim 8 wherein said means controlled by said third source for generating a third local signal comprise means for generating a third local signal having a frequency identical to that of said third radio signal.

10. A position locating system according to claim 8 wherein said means for developing a signal having a frequency identical to that of said third local signal comprise additional mixer means responsive to said third radio signal as received at said third point.

11. A position locating system according to claim 10 wherein said additional mixer means is provided with at least one locally generated signal produced under the control of said third source of signal.

12. A position locating system according to claim 8 including computer means for receiving output signals from said first phase comparing means, said second phase comparing means, said third phase comparing means, said means for comparing respectively said first time signal and said second time signal with said time reference signals and said means for comparing said third time signal with said time reference signals for providing output signal data representative of distance said third point is from the first, second and fourth points.

13. A position locating system as claimed in claim 12 including means controlled by said computer means for storing and displaying said output signal data.

14. A position locating method using phase of carrier signals and phase modulation signals thereon to develop respectively fine and coarse position location data, the method comprising providing a first signal of given frequency and given phase, providing a second signal of said given frequency and a predetermined phase relationship with said given phase, providing a third signal of said given frequency and a predetermined phase relationship with said given phase, periodically phase modulating a first radio signal related to said first signal with a first time signal also related to said first signal, transmitting the first radio signal from a first point, periodically phase modulating a second radio signal related to said second signal with a second time signal also related to said second signal, transmitting the second radio signal from a second point, generating a first local signal having a frequency related to that of said first radio signal and a second local signal having a frequency related to that of said second radio signal at a third point, generating time reference signals related to the third signal at the third point, receiving said first radio signal and said second radio signal at said third point, phase demodulating to recover said first time signal and said second time signal, developing at said third point from said first radio signal and said second radio signal respectively signals having respective frequencies identical to the frequencies of said first local signal and said second local signal, comparing the phase of said first local signal with that of the corresponding signal developed from said first radio signal, comparing the phase of said second local signal with that of the corresponding signal developed from said second radio signal, and comparing respectively the recovered first time signal and the recovered second time signal with said time reference signals.

15. A position locating method according to claim 14 wherein said first signal, said second signal and said third signal are respectively provided from first, second and third atomic clocks.

16. A position locating method according to claim 14 wherein the steps of generating a first local signal and a second local signal comprise the steps of generating a first local signal having a frequency identical to that of said first radio signal, and generating a second local signal having a frequency identical to that of said second radio signal.

17. A position locating method according to claim 14 wherein the steps of developing at said third point from said first radio signal and said second radio signal respectively signals having respective frequencies identical to the frequencies of said first local signal and said second local signal include heterodyning said first radio signal and said second radio signal received at said third point with local signals produced under control of said third signal of given frequency and phase.

18. A position locating method according to claim 14 including further determining relative position of said third point with respect to said first point and to said second point using signals produced by all of said comparing steps.

19. A position locating method according to claim 14 including providing a fourth signal of the given frequency and a predetermined phase relationship with said given phase, periodically phase modulating a third radio signal related to said fourth signal with a third time signal also related to said fourth signal, transmitting the third radio signal from a fourth point, receiving said third radio signal at said third point, generating a third local signal having a frequency related to that of said third radio signal at said third point, phase demodulating to recover said third time signal, developing at said third point from said third radio signal a signal having a frequency identical to said third local signal, comparing the phase of the third local signal with that of the corresponding signal developed from said third radio signal, and comparing the recovered third time signal with said time reference signals.

20. A position locating method according to claim 19 wherein the step of generating a third local signal comprises the step of generating a third local signal having a frequency identical to that of said third radio signal.

21. A position locating method according to claim 19 wherein the step of developing at said third point from said third radio signal a signal having a frequency identical to that of said third local signal includes heterodyning said third radio signal received at said third point with a local signal produced under control of said third signal of given frequency and phase.

22. A position locating method according to claim 19 including further determining relative position of said third point with respect to said first point, to said second point and to said fourth point using signals produced by all of said comparing steps.

23. A position locating system using phase of carrier signals and phase modulation signals thereon to develop respectively fine and coarse position location data, the system comprising a plurality of sources of signals of given frequency and predetermined phase relationships, means controlled respectively by each of said plurality of sources for transmitting from respective points respective signals including phase modulating means controlled respectively by respective ones of said plurality of sources for intermittently phase modulating said respective signals with respective time signals, means controlled by a source of signal having the same given frequency as said plurality of sources of signals and having a predetermined phase relationship for generating a plurality of local signals related to said respective signals at an additional point, means controlled by said source of signal at said additional point for producing time reference signals, means for receiving said respective signals at said additional point and for developing a further plurality of signals therefrom corresponding respectively and identically in frequency to said plurality of local signals, phase comparing means at said additional point for comparing respectively the phase of each of said plurality of local signals with the phase of individual ones of the signals corresponding respectively and identically in frequency to said plurality of local signals, means at said additional point for phase demodulating said respective time signals, and means for comparing the recovered respective time signals with said time reference signals.

24. A position locating system according to claim 23 wherein said plurality of sources of signals are two sources of signals and the respective points are two points.

25. A position locating system according to claim 23 wherein said plurality of sources of signals are three sources of signals and the respective points are three points.

26. A position locating system according to claim 25 wherein at least one of said plurality of sources of signals is carried by a satellite.

27. A position locating system according to claim 25 wherein said source of signal at said additional point is carried by an aircraft.

28. A position locating system according to claim 24 wherein said source of signal at said additional point is carried by an aircraft, said aircraft having an altimeter.

29. A position locating system according to claim 23 wherein said means for receiving said respective signals includes heterodyning means controlled by said source of signal at said additional point for reducing the frequency of the respective signals.

30. In a position locating system in which a plurality of periodically modulated radio signals from respective ones of a plurality of points are received at a receiving station at an additional point and in which phase of carrier signals and phase modulation signals thereon are used to develop respectively fine and coarse position location data, at least one transmitting station comprising a radio transmitter having a radiating means, a frequency standard, means coupled between said frequency standard and said radio transmitter for supplying a radio frequency signal of fixed given frequency thereto, means coupled to and controlled by said frequency standard for developing time signals in the form of pulses, and phase modulating means coupled between said means for developing time signals and said radio transmitter for periodically phase modulating said transmitter.

31. A radio receiving station using phase of carrier signals and phase modulation signals thereon to develop respectively fine and coarse position location data, the station comprising means for receiving a plurality of radio signals, phase demodulating means for recovering respective time signals intermittently modulated on each of said plurality of radio signals, a stable frequency standard source of oscillations, means responsive to said source of oscillations for producing time reference signals, means responsive to said source of oscillations for producing a plurality of local reference frequency signals of predetermined fixed phases, means responsive to the plurality of radio signals as received for developing therefrom a plurality of corresponding signals respectively identical in frequency to respective ones of said plurality of local reference frequency signals, means for comparing each of said time signals with said time reference signals, and means for comparing the phase of each of the plurality of local reference frequency signals with respective ones of the corresponding signals developed from said radio signals.

32. A radio receiving station as claimed in claim 31 wherein said source of oscillations comprises an atomic clock.

33. A radio receiving station as claimed in claim 31 wherein said means for receiving said plurality of signals comprises means for receiving two signals.

34. A radio receiving station as claimed in claim 31 wherein said means for receiving said plurality of signals comprises means for receiving three signals.

35. A radio receiving station as claimed in claim 31 further including means coupled to said means for comparing phase and said means for comparing each of said time signals with said time reference signals for determining the location of the receiving station from respective transmitting stations which transmit respective ones of the plurality of radio signals.

36. A radio receiving station as claimed in claim 31 including mixer means responsive to signals derived from said source of oscillations and to each of said plurality of signals for reducing the frequency of each of said plurality of signals to a plurality of signals of lower frequency, and means for supplying said plurality of signals of lower frequency to said means for comparing the phase.

37. A radio receiving station as claimed in claim 36 wherein said mixer means is supplied with a plurality of signals derived from means controlled by said source of oscillations.

38. A radio receiving station as claimed in claim 31 wherein said receiving station is carried on a vehicle.

39. A radio receiving station as claimed in claim 38 wherein said vehicle is a ship.

40. A radio receiving station as claimed in claim 34 wherein said receiving station is carried on a device movable in three dimensions.

41. A receiving station as claimed in claim 40 wherein said device is an aircraft.

42. A receiving station as claimed in claim 31 including a computer means responsive to output signals from said means for comparing each of said time signals with said time reference signals and to output signals from said means for comparing the phase for producing output signal data, whereby the distance the receiving station is from each of a plurality of transmitting stations may be determined and the position of the receiving station located.

43. A receiving station as claimed in claim 42 including means responsive to said output signal data from said computer means for storing and displaying said output signal data.

* * * * *